(12) United States Patent
Hans et al.

(10) Patent No.: US 11,321,304 B2
(45) Date of Patent: May 3, 2022

(54) DOMAIN AWARE EXPLAINABLE ANOMALY AND DRIFT DETECTION FOR MULTI-VARIATE RAW DATA USING A CONSTRAINT REPOSITORY

(71) Applicant: International Business Machines Corporation, Armonk, NY (US)

(72) Inventors: Sandeep Hans, New Delhi (IN); Samiulla Zakir Hussain Shaikh, Bangalore (IN); Rema Ananthanarayanan, New Delhi (IN); Diptikalyan Saha, Bangalore (IN); Aniya Aggarwal, New Delhi (IN); Gagandeep Singh, Bangalore (IN); Pranay Kumar Lohia, Bhagalpur (IN); Manish Anand Bhide, Hyderabad (IN); Sameep Mehta, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 350 days.

(21) Appl. No.: 16/585,664

(22) Filed: Sep. 27, 2019

(65) Prior Publication Data

US 2021/0097052 A1      Apr. 1, 2021

(51) Int. Cl.
  *G06F 16/23*      (2019.01)
  *G06F 16/901*     (2019.01)
  (Continued)

(52) U.S. Cl.
  CPC ........ *G06F 16/2365* (2019.01); *G06F 16/215* (2019.01); *G06F 16/9027* (2019.01); *G06N 5/02* (2013.01); *G06N 20/00* (2019.01)

(58) Field of Classification Search
  None
  See application file for complete search history.

(56) References Cited

U.S. PATENT DOCUMENTS 7,739,211 B2   6/2010   Coffman et al.
9,360,855 B2   6/2016   Akiyama et al.
(Continued)

FOREIGN PATENT DOCUMENTS

CN      109656812      1/2014

OTHER PUBLICATIONS

Yin, Chunyong, et al., "Anomaly Detection Model Based on Data Stream Clustering", Cluster Computing (2019) 22, pp. S1729-S1738, Published Online Aug. 1, 2017. (Year: 2019).*

(Continued)

*Primary Examiner* — Scott A. Waldron
(74) *Attorney, Agent, or Firm* — Ryan, Mason & Lewis, LLP

(57) ABSTRACT

Methods, systems, and computer program products for domain aware explainable anomaly and drift detection for multi-variate raw data using a constraint repository are provided herein. A computer-implemented method includes obtaining a set of data and information indicative of a domain of said set of data; obtaining constraints from a domain-indexed constraint repository based on said set of data and said information, wherein the domain-indexed constraint repository comprises a knowledge graph having a plurality of nodes, wherein each node comprises an attribute associated with at least one of a plurality of domains and constraints corresponding to the attribute; detecting anomalies in said set of data based on whether portions of said set of data violate said retrieved constraints; generating an explanation corresponding to each of the anomalies that describe the attributes corresponding to the violated constraints; and outputting an indication of the anomalies and the corresponding explanation.

20 Claims, 9 Drawing Sheets

(51) Int. Cl.
    *G06N 5/02*     (2006.01)
    *G06N 20/00*    (2019.01)
    *G06F 16/215*   (2019.01)

(56) References Cited

U.S. PATENT DOCUMENTS

| | | |
|---|---|---|
| 10,067,812 B2 | 9/2018 | Mullarkey et al. |
| 10,116,674 B2 | 10/2018 | Baradaran et al. |
| 10,230,747 B2 | 3/2019 | Kopp et al. |
| 2009/0248641 A1* | 10/2009 | Duan ................. G06F 16/2365 |
| 2014/0062712 A1* | 3/2014 | Reiter ..................... G06F 40/14 |
| | | 340/691.6 |
| 2017/0330109 A1* | 11/2017 | Maughan ................. G06N 5/04 |
| 2019/0220524 A1 | 7/2019 | Costabello et al. |
| 2019/0356505 A1* | 11/2019 | Madden ................ H04L 12/282 |
| 2020/0293917 A1* | 9/2020 | Wang ..................... G06N 20/00 |

OTHER PUBLICATIONS

Wang, Hanzhang, et al., GRANO: interactive graph-based root cause analysis for cloud-native distributed data platform:, Proceedings of the VLDB Endowment, vol. 12 No 12, pp. 1942-1945, Published Aug. 1, 2019. (Year: 2019).*

McFowland III, "Fast Generalized Subset Scan for Anomalous Pattern Detection," Journal of Machine Learning Research 14, pp. 1533-1561 (2013).

"What is the Anomaly Detector API?" Azure Cognitive Services, Microsoft Docs, https://docs.microsoft.com/en-us/azure/cognitive-services/anomaly-detector/overview, downloaded Sep. 25, 2019.

\* cited by examiner

DOMAIN AWARE EXPLAINABLE ANOMALY AND DRIFT DETECTION FOR MULTI-VARIATE RAW DATA USING A CONSTRAINT REPOSITORY

BACKGROUND

The present application generally relates to information technology and, more particularly, anomaly and drift detection.

Anomaly detection relates to identifying irregularities in data and, generally, relies on statistical or machine learning-based approaches that are applied to numerical or encoded data. Typically, these approaches cannot be applied to raw data.

Anomaly detection is used in a variety of applications such as, for example, intrusion detection, fraud detection, fault detection, system health monitoring, event detection in sensor networks, and detecting ecosystem disturbances.

SUMMARY

In one embodiment of the present invention, techniques for domain aware explainable anomaly and drift detection for multi-variate raw data using constraint repository are provided. An exemplary computer-implemented method includes the steps of obtaining (i) a set of data and (ii) information indicative of a domain of the set of data; detecting one or more anomalies in the set of data based at least in part on a domain-indexed constraint repository, the domain-indexed constraint repository comprising a knowledge graph having a plurality of nodes, wherein each node comprises (i) an attribute associated with at least one of a plurality of domains and (ii) one or more constraints corresponding to the attribute; generating an explanation corresponding to each of the one or more anomalies; and outputting (i) an indication of the one or more anomalies and (ii) the corresponding natural language explanations.

Another exemplary computer-implemented method includes the steps of obtaining a set of data files comprising training data, wherein each data file in the set corresponds to one of a plurality of domains; for each given data file in the set: (i) inferring at least one constraint from at least a portion of the training data of the given data file, and (ii) storing the at least one inferred constraint at a node in a domain-indexed constraint repository, wherein the node represents the domain corresponding to the given data file, and wherein the domain-indexed constraint repository comprises a set of nodes that define hierarchical relationships of the plurality of domains; aggregating the inferred constraints stored in the domain-indexed constraint repository based on the hierarchical relationships of the plurality of domains; retrieving one or more constraints from the domain-indexed constraint repository based on a domain of a new data file; and detecting one or more anomalies in the new data file based on whether one or more portions of the new data file violate the retrieved one or more constraints; outputting (i) an indication of the one or more anomalies and (ii) a natural language explanation that describes how the portions of the new data file violate the retrieved one or more constraints.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Existing anomaly and drift detection techniques do not provide explanations when anomalies are detected apart from, for example, the region of expected values and its distance from the actual value. There is no intuitive explanation regarding how the expected value is computed. Existing techniques also tend to require input data to be transformed or encoded and/or fail to consider the domain of the user.

Many use cases of anomaly and drift detection can benefit from providing an intuitive natural language explanation along with the detected anomalies. Additionally, existing anomaly and drift detection techniques focus on time series datasets for anomaly detection, and thus do not consider anomalous outliers, and/or drifted data points in non-temporal datasets.

As described herein, an embodiment of the present invention includes providing explainable anomaly detection for datasets. For example, a smart data engineering platform may be provided that automatically detects anomalies relevant to a user's context (or domain) and also provide explanations regarding these detected anomalies. Also, according to at least one embodiment, the quality of new or existing data in reference with a base dataset is computed. The computed quality may then be used to, for example, validate data imports from various data sources. In one or more example embodiments, automatic drift detection is applied to live payload data for a machine learning model.

Figure 1:
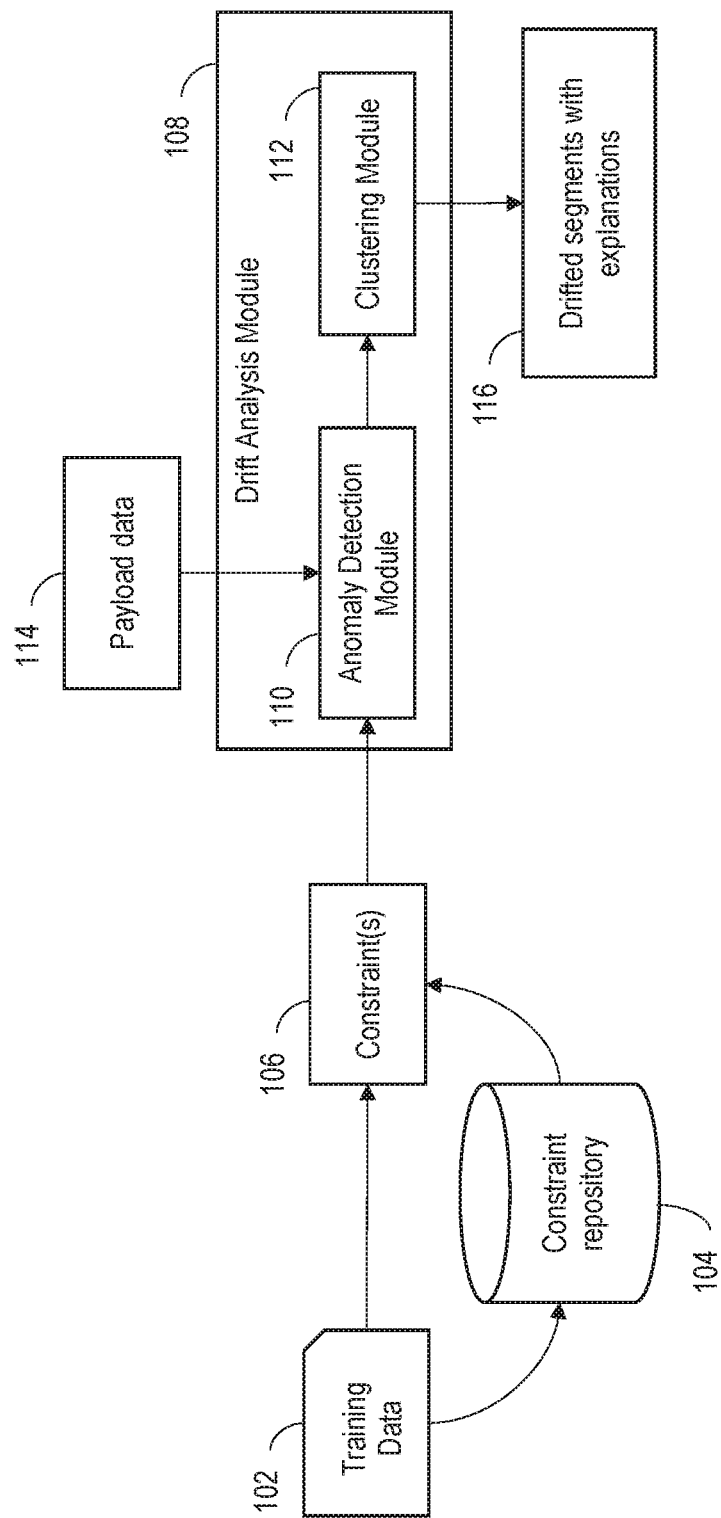
FIG. 1 is a diagram illustrating a system architecture according to an exemplary embodiment of the invention.

Referring now to FIG. 1, this figure shows an example of a system architecture according to an exemplary embodiment of the invention. The example shown in FIG. 1 is applicable to, for example, automatic drift detection in live payload data for a machine learning model. The system architecture depicted in FIG. 1 includes a constraint repository 104 and a drift analysis module 108. In some examples, the constraint repository 104 comprises a Knowledge Graph (KG) corresponding to a plurality of domains, wherein each node in the KG may be assigned one or more constraints. The one or more constraints may be learned, for example, based on the training data 102.

The drift analysis module 108 includes an anomaly detection module 110 and a clustering module 112. Payload data 114 (e.g., live, or real-time, payload data to be fed into deployed machine learning model) is provided to the anomaly detection module 110, as well as constraint(s) 106 that are pertinent to payload data 114. The anomaly detection module 110 applies the constraints 106 to the payload data 114 to detect one or more anomalies, which are then clustered by the clustering module 112. Based on the clustering, the clustered module 112 determines drifted segments of data. Additionally, the drift analysis module 108 generates explanations of how the drifted segments were computed. The drift analysis module 108 then outputs the drifted segments with the corresponding explanations 116 to, for example, a user. For example, the drift analysis module 108 may cluster the detected anomalies into a plurality of clusters, and if the size of a given cluster is greater than a threshold, then it is termed as drift. The clustering may be performed based on the type of anomalies and their parameters, such as distance from the expected values, for example.

Figure 2:
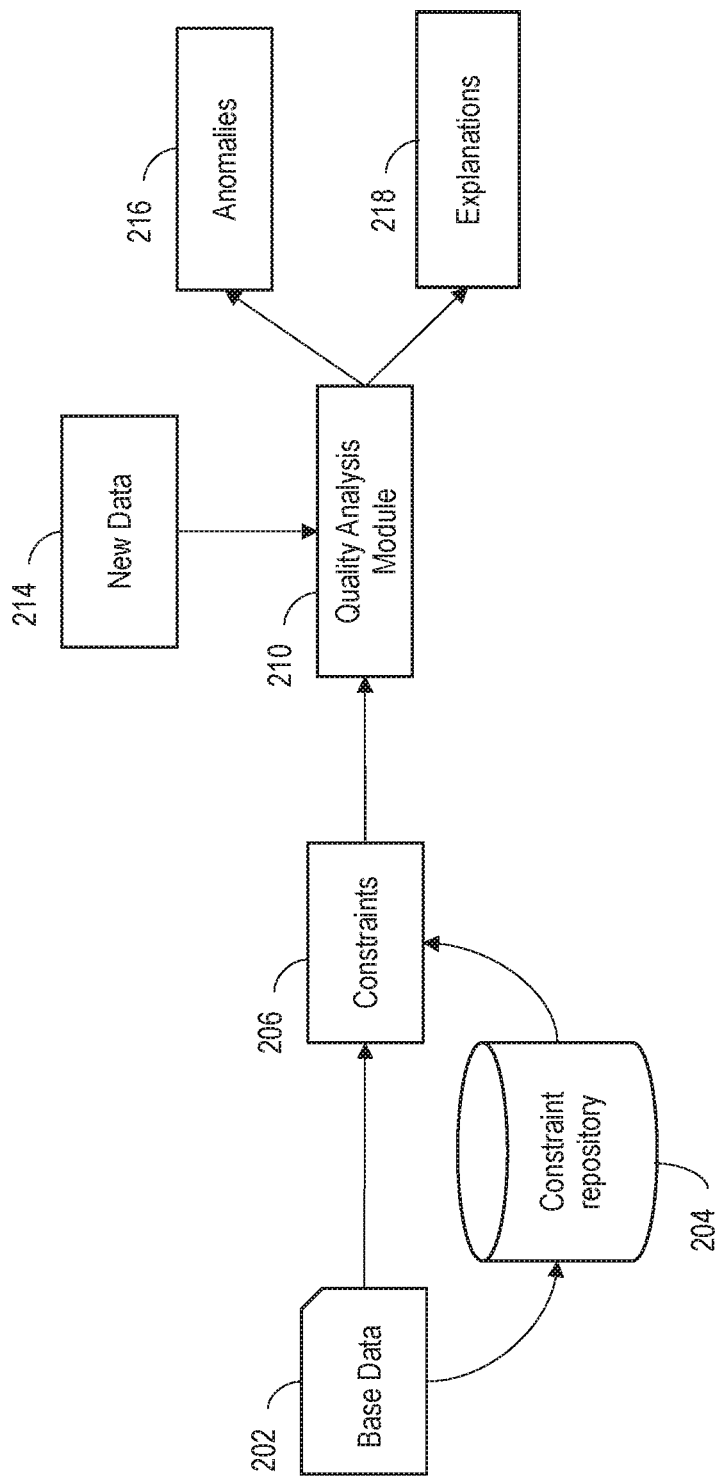
FIG. 2 is a diagram illustrating another system architecture according to an exemplary embodiment of the invention.

Referring now to FIG. 2, this figure shows another example of a system architecture according to an exemplary embodiment of the invention. The example shown in FIG. 2 is applicable to, for example, detecting anomalies based on data quality. The system architecture depicted in FIG. 2 includes a constraint repository 204 and a quality analysis module 210. The constraint repository 204 may include, for example, a KG corresponding to a plurality of domains, where each node in the KG is assigned one or more constraints based on, for example, base dataset 202.

The quality analysis module 210 computes quality of new data 214 (e.g., data being imported into a database) relative to a base dataset 202 using constraints 206 from the constraint repository 204. The quality analysis module 210 automatically detects anomalies 216 and generates explanations 218 (e.g., natural language explanations) based on the computed quality of the new data 214, which may then be output to, for example, a user. In at least one embodiment, the anomalies 216 and explanations 218 may be used to automatically validate or verify the new data 214.

Figure 3:
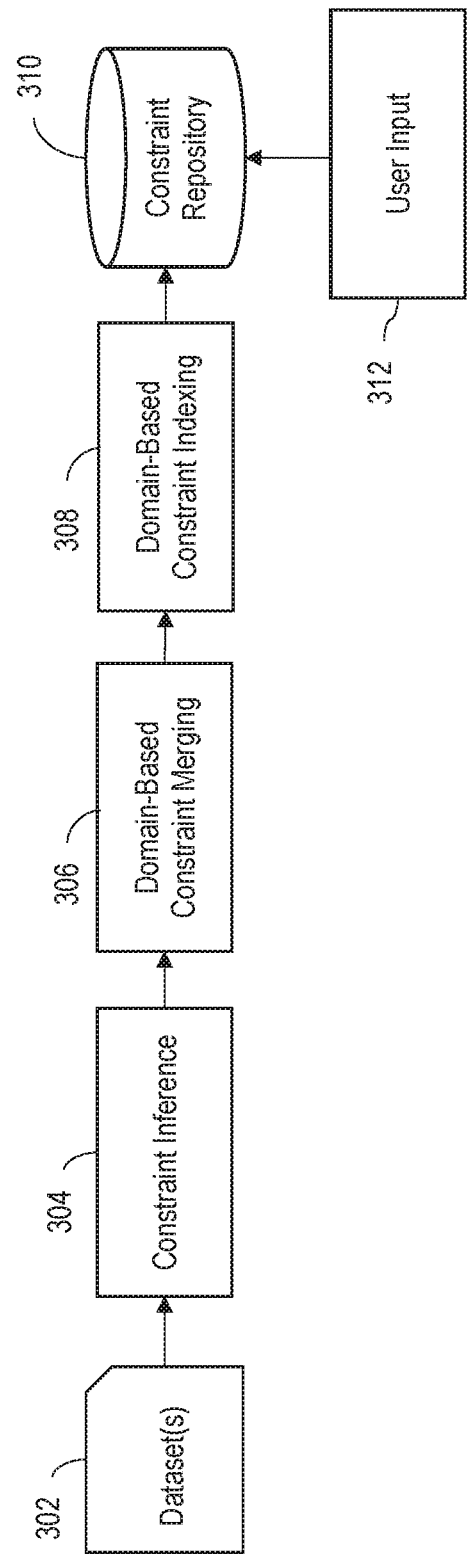
FIG. 3 is a process flow diagram for generating a constraint repository in accordance with exemplary embodiments.

Referring now to FIG. 3, this figure is a process flow diagram for populating a KG of a constraint repository 310 in accordance with exemplary embodiments. The constraint repository 310 includes a KG having a domain structure. More specifically, the domain structure includes a domain hierarchy that aligns or groups underlying data according to semantics of the domain hierarchy. For example, a group of domains are covered under a parent domain (e.g., a parent domain of "Companies" covers IT Companies, Banks, etc.).

At step 304, a set of constraints are inferred from one or more datasets 302 (such as data files, for example). The set of constraints may be inferred using inference rules that can be based on a data-type (e.g., text, numeric, etc.) or based on an attribute type (e.g., date of birth, salary, PIN code, etc.). The process continues to step 306, where a domain-based constraint merging process is performed. The domain-based constraint merging process may include determining statistics of constraints from different ones of the datasets 302 under specific domains, and merging the constraints according to merging rules based on, for example, a data-type or an attribute type. In some example embodiments, merging operations may be performed on a per-request basis, such as when a user provides user input 312 that, for example, includes a request for specific constraints with respect to a specific attribute at specific domain. Step 308 includes performing domain-based constraint indexing which indexes the constraints to nodes of the KG in the constraint repository 310. Thus, constraints may be retrieved that include the holistic constraint information of the specific domain and domains lying under the hierarchy.

According to one or more example embodiments, a KG is stored in a content repository (e.g., content repository 310) using the following types of vertices:

Domain Vertices (DV): Each domain vertex represents a specific domain (e.g., IT companies, banks, etc.).

File Information Vertices (FIV): each dataset (or file) is represented by a unique identifier (e.g., FileID), and each FIV represents a node with respect to each file (indexed by FileID). The FIV includes file level metadata information, such as number of rows, number of columns, etc.).

File level Constraint Vertices (FLCV): Each attribute of a given file may be involved in single attribute or multi-attribute constraint. Each constraint represents a separate FLCV in the KG. The FLCV property includes the constraint information statistics.

Domain level constraint vertices (DLCV): Each DLCV includes the aggregated statistics of a particular constraint at a given domain. The aggregation involves all information from files which lie in the sub-domain hierarchy of the given domain. The DLVC are generated on a per request basis at the given domain. A DLCV may maintain an 'updated' flag that signifies whether the constraint statistics are updated or not.

Additionally, the KG may include the following types of edge relations:

subdomain: Defines relation between immediate hierarchical domains (e.g., a domain vertex "IT Companies" is a subdomain of "Companies").

attachedTo: Defines relation between FIVs and DVs.

fileConstaintsOf: Defines relation between a FIVs and FLCVs.

domainConstrainOf: Defines relation between DLCVs and DVs.

Given a data file and a domain as input, constraints may be added to the knowledge graph by inferring constraints from the data file (e.g., a constraint for an 'age' column in the data file may include inferring statistics such as, min, max, and median, for example). Next, a FIV is then created for the dataset, and a FLCV is created for each constraint that links to the FIV vertex. The FIV vertex is linked to the corresponding DV (e.g., based on the input domain). For each FLCV in FIV, a test is performed to check if DLCV vertex in DV. If the updated flag is set to True, then the value of the flag is changed to False, and the process is repeated for the parent DV. If the updated flag is set to False, then the constraint is added.

Constraints stored in the KG may be retrieved by providing a constraint attribute and a domain as input based on the following process. DLCV processing is performed which includes performing a test that checks if a DLCV exists with respect to the input constraint attribute at a DV with respect to the input domain. If the DLCV exists and the update flag is set to True, then the vertex information statistics are returned. Otherwise, FLCV processing is performed which includes, for each FIV linked with a DIV corresponding to the input domain, a first list of FLCVs is created by checking each FLCV with respect to the input constraint attribute, and collating the information for all FLCVs in the list. Sub-domain processing is then performed, which includes generating a second list of DIVs with respect to subdomains of the input domain, and calling a constraint access flow for all DIVs in the second list. The information is collated for each call in the second list.

The information of the first list and the information of the second list are merged using merging rules (e.g., specific to a data type or an attribute). The merged information is stored at the DLCV vertex corresponding to the input domain, and the update flag is set to True. The process then returns the merged information.

Figure 4:
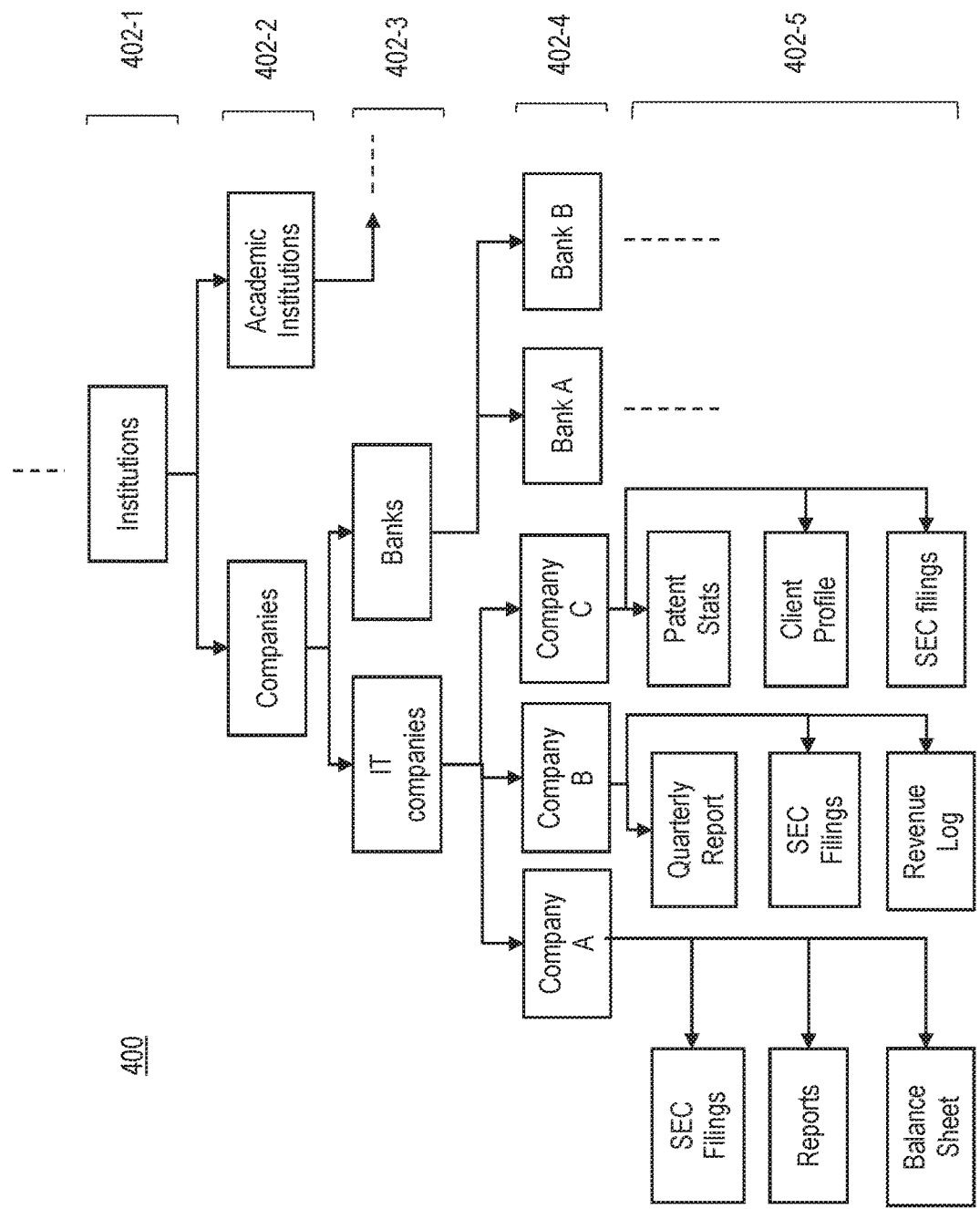
FIG. 4 is a diagram illustrating an example of a subtree of a constraint repository in accordance with exemplary embodiments.

Referring now to FIG. 4, this figure illustrates an example of a subtree 400 of a constraint repository in accordance with exemplary embodiments. For example, the subtree 400 may be part of a KG in the constraint repository. The subtree 400 includes a number of levels 402-1 to 402-5 (collectively referred to as levels 402). The root node at layer 402-1 indicates the subtree 400 represents 'institutions.' Each consecutive level 402 increases the level abstraction relative to prior nodes. For example, level 402-2 includes a 'companies' node and level 402-3 includes nodes corresponding to types of companies, i.e., IT companies and Banks).

According to one or more example embodiments, datasets may be mapped to nodes of a KG in a constraint repository. If no suitable KG node is found, then a new node is created under the most specific abstract node. For example, referring again to FIG. 4, if a new dataset (e.g., a data file or document) includes information for an IT Company named 'Company D', then a new node under the 'IT companies' node will be created for Company D as there is no existing node for such a company. Constraints are learnt from each new dataset (e.g., from a set of training datasets or based on new datasets). The constraints are then added to the respective nodes in the constraint repository. Constraints over intermediate nodes may be determined by aggregating the constraints over all the subtrees.

In accordance with at least one example embodiment, new datasets (or documents) are validated against the constraint repository. For example, a new dataset is mapped to the most specific possible node in the constraint repository. Referring against to FIG. 4, assume a new dataset includes information for an IT Company named 'Company E.' Since there is no 'Company E' in the subtree 400, then the dataset is mapped to the "IT Companies" node instead. The constraints in the mapped node are then used to validate the records in the test dataset for anomalies.

In some example embodiments, the constraint repository stores domain graphs (e.g., using JanusGraph®) wherein the constraints are associated with the attributes. This allows, for example, the attributes for a given domain to be searched, the constraints of attributes to be retrieved, and CRUD (Copy, Read, Update, and Delete) operations to be performed on the domains and constraints.

Additionally, constraints in the constraint repository may be merged across datasets and across different domains. For example, an age constraint of 28<Age<42 having weights associated with subranges (e.g., 29-30, 31-34, 35-39, and 40-42) may be merged to form constraints of, for example, 29<Age<34 and 34<Age<42 for respective 'age' nodes in the constraint repository.

Figure 5:
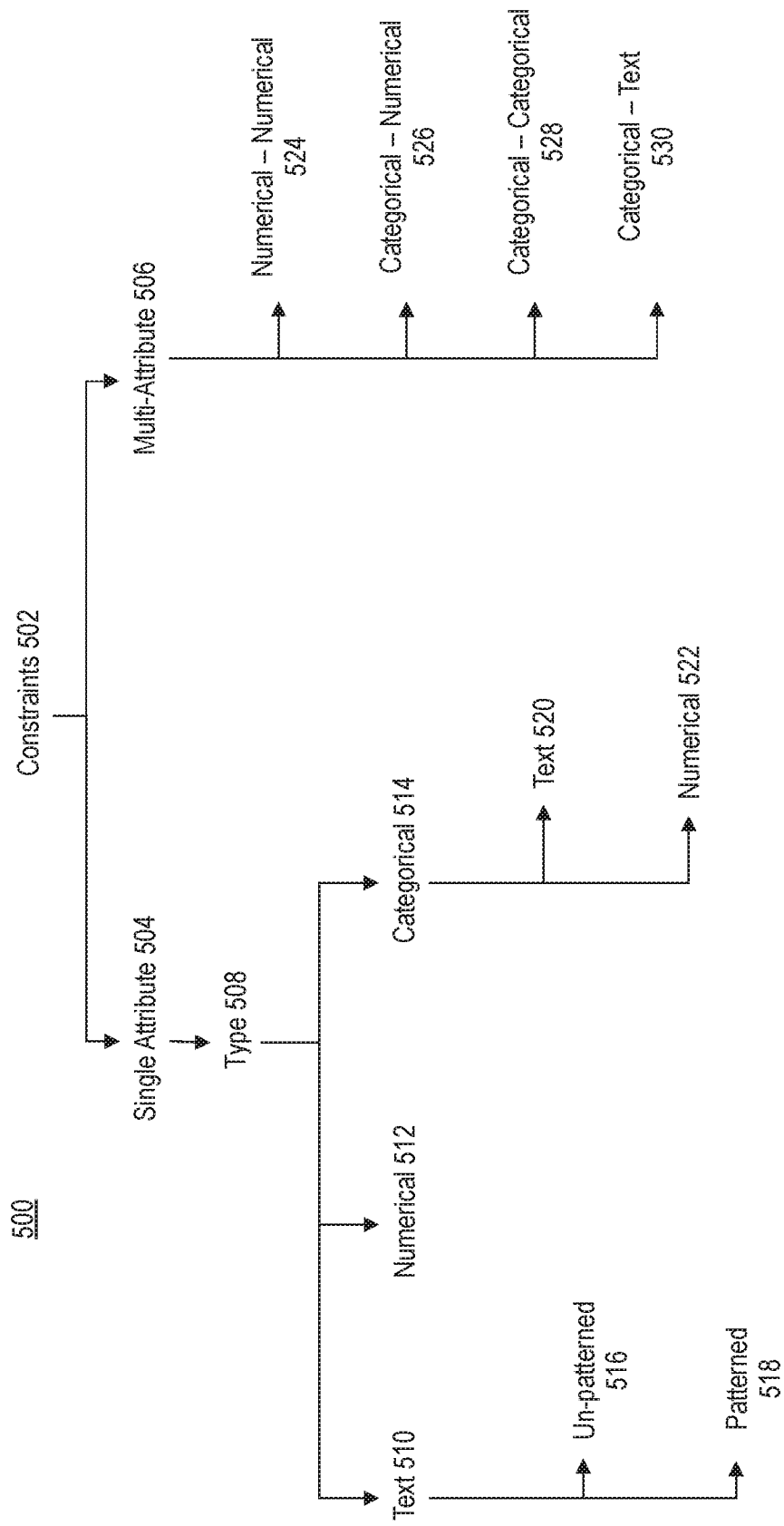
FIG. 5 is a flow diagram of a process for inferring constraints in accordance with exemplary embodiments.

FIG. 5 is a flow diagram 500 for inferring constraints from a dataset in accordance with exemplary embodiments. In this example, the constraints 502 are divided into single attribute constraints 504 and multi-attribute constraints 506. The single attribute constraints 504 include three different types 508, namely, a text type 510, a numerical type 512, and a categorical type 514, which can be identified based on uniqueness of data corresponding to the attribute, for example.

The text type 510 may be un-patterned 516 (e.g., comments in document, names, etc.), in which case anomalies can be detected by maintaining unigram and bi-gram frequencies of text in a Trie, for example. For a patterned type 518 (e.g., a phone number, date, social security number, etc.) anomalies can be detected based on whether or not the text follows a regular expression, for example. For a numerical type 512 attribute, an anomaly can be detected based on the statistical properties, such as distributions or ranges (min, max), for example. Categorical type 514 may be in the form of text 520 (e.g., gender), or numerical 522 (e.g., country names, quarter numbers, etc.), and an anomaly can be based on probabilities values. By way of example, if P(value) $<10^{-4}$ for a record in a dataset having a categorical type 514, then the record is detected as being anomalous.

Multi-attribute 506 constraints include combinations of single attributes. For example, in the example shown in FIG. 4 the different types of multi-attribute 506 constraints include numerical-numerical 524 (e.g., Age-Salary); categorical-numerical 526 (e.g., marital status, age); categorical-categorical 528 (e.g., country, state); and categorical-text 530 (e.g., name, gender).

Some non-limiting examples of how multi-attribute 506 constraints may be used to detect anomalies are as follows:
  Numerical-Categorical: For each discovered range of a numeric attribute, if p(value)<10-4 for categorical attribute, then anomaly is detected.
  Numerical-Numerical: For each discovered range of an independent numerical attribute, a linear, polynomial, or exponential function is learnt with some confidence value; if the value of the dependent numerical attribute lies far away from the learned function beyond a margin determined by the confidence, then it is detected as being an anomaly.
  Categorical-Categorical: Pairs of categorical attributes having confidence(x→y) lower than the threshold are flagged as anomalous.
  Categorical-Numerical: A separate distribution of the numerical attribute will be learnt for each value of the categorical attribute, and samples out of distribution are detected as being anomalies.

By way of example, assume the following constraints are inferred from a base dataset having marital status and age attributes.
  confidence(0<age<=18)=100%
  confidence(100>age>18)=exp(−x/50−18)

This constraint could be applied to a target dataset to determine confidence values of the records in the target dataset. For example, a record of 'single, 5' would result in a confidence level of 100%, whereas a record of "married, 14" would result in a confidence level of 0%. Both of these example could be detected as being anomalous and an explanation could be generated detailing why the records were marked as anomalous in accordance with one or more example embodiments. In case of records being updated/ inserted, then anomalies can also be detected. For example, a record of "single, 140" being added to the base dataset may be detected as anomalous as the confidence value is also 0%.

Figure 6:
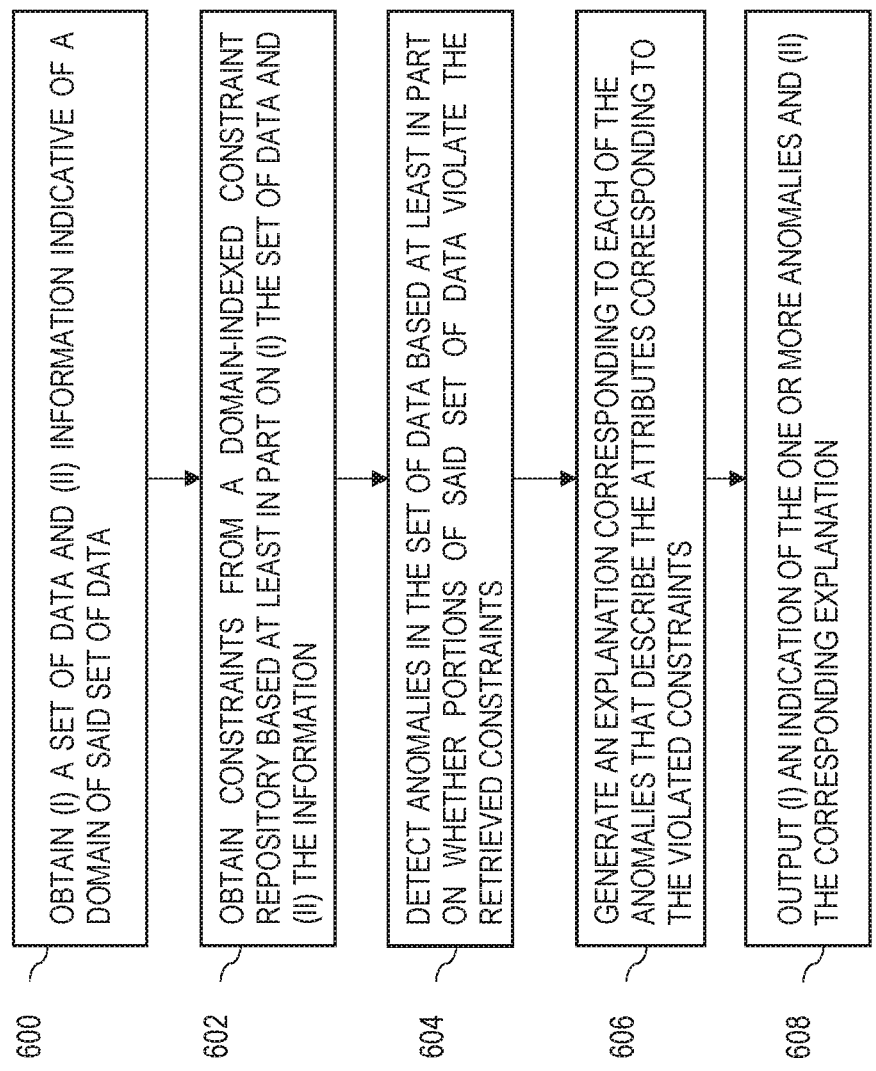
FIG. 6 is a flow diagram illustrating techniques according to an embodiment of the invention.

FIG. 6 is a flow diagram illustrating techniques according to an embodiment of the present invention. Step 600 includes obtaining (i) a set of data and (ii) information indicative of a domain of the set of data. Step 602 includes obtaining one or more constraints from a domain-indexed constraint repository based at least in part on (i) said set of data and (ii) said information, wherein the domain-indexed constraint repository comprises a knowledge graph having a plurality of nodes, wherein each node comprises (i) an attribute associated with at least one of a plurality of domains and (ii) one or more constraints corresponding to said attribute. Step 604 includes detecting one or more anomalies in said set of data based at least in part on whether one or more portions of said set of data violate said obtained one or more constraints. Step 606 includes generating an explanation corresponding to each of said one or more anomalies that describe the attributes corresponding to the violated one or more constraints. Step 608 includes outputting (i) an indication of said one or more anomalies and (ii) the corresponding explanations.

Each of one or more subtrees of the knowledge graph may correspond to a given one of the plurality domains, and each level of a given one of the subtrees may increase a level of abstraction of the given domain relative to a previous level in the given subtree. The detecting may include mapping the set of data to one or more of the plurality of nodes based on said information indicative of the domain of said dataset; and applying the constraints of the mapped nodes to the set of data to detect the one or more anomalies. The one or more constraints may include at least one of: a single attribute constraint; and a multi-attribute constraint. The single attribute constraint may correspond to one of: (i) a text attribute; (ii) a numerical attribute; and (iii) a categorical attribute, and wherein the multi-attribute constraint corresponds to two or more of: (i) a text attribute; (ii) a numerical attribute; and (iii) a categorical attribute. Each constraint may include a model that is based on one or more of (i) the type of the single attribute constraint, and (ii) the type of the multi-attribute constraint, and wherein said detecting comprises applying said model to at least a portion of the set of data. The set of data may include real-time data of at least one machine learning model, and the process in FIG. 6 may include: detecting drift in one or more segments of said real-time data using a machine learning clustering technique; and outputting segments of said real-time data corresponding to said drift. Generating the explanation corresponding to each of the one or more anomalies may include generating and outputting an explanation for each of said segments of said real-time data corresponding to said drift. The explanation corresponding to each of said one or more anomalies may include a natural language explanation that describe how said portions violate said retrieved one or more constraints. The detecting may include determining a value indicating a quality of the set of data based on a comparison of the set of data to a baseline set of data. Optionally, the process depicted in FIG. 6 may include validating said set of data in response to the value indicating the quality of the set of data satisfying a threshold value. The set of data may include raw data that are neither encoded nor transformed.

Another exemplary embodiment includes a method comprising obtaining a set of data files comprising training data, wherein each data file in the set corresponds to one of a plurality of domains; for each given data file in the set: (i) inferring at least one constraint from at least a portion of the training data of the given data file, and (ii) storing the at least one inferred constraint at a node in a domain-indexed constraint repository, wherein the node represents the domain corresponding to the given data file, and wherein the domain-indexed constraint repository comprises a set of nodes that define hierarchical relationships of said plurality of domains; aggregating the inferred constraints stored in the domain-indexed constraint repository based on the hierarchical relationships of said plurality of domains; retrieving one or more constraints from the domain-indexed constraint repository based on a domain of a new data file; and detecting one or more anomalies in the new data file based on whether one or more portions of the new data file violate the retrieved one or more constraints; outputting (i) an indication of said one or more anomalies and (ii) a natural language explanation that describes how said portions of the new data file violate said retrieved one or more constraints.

The techniques depicted in FIG. 6 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 6 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 7:
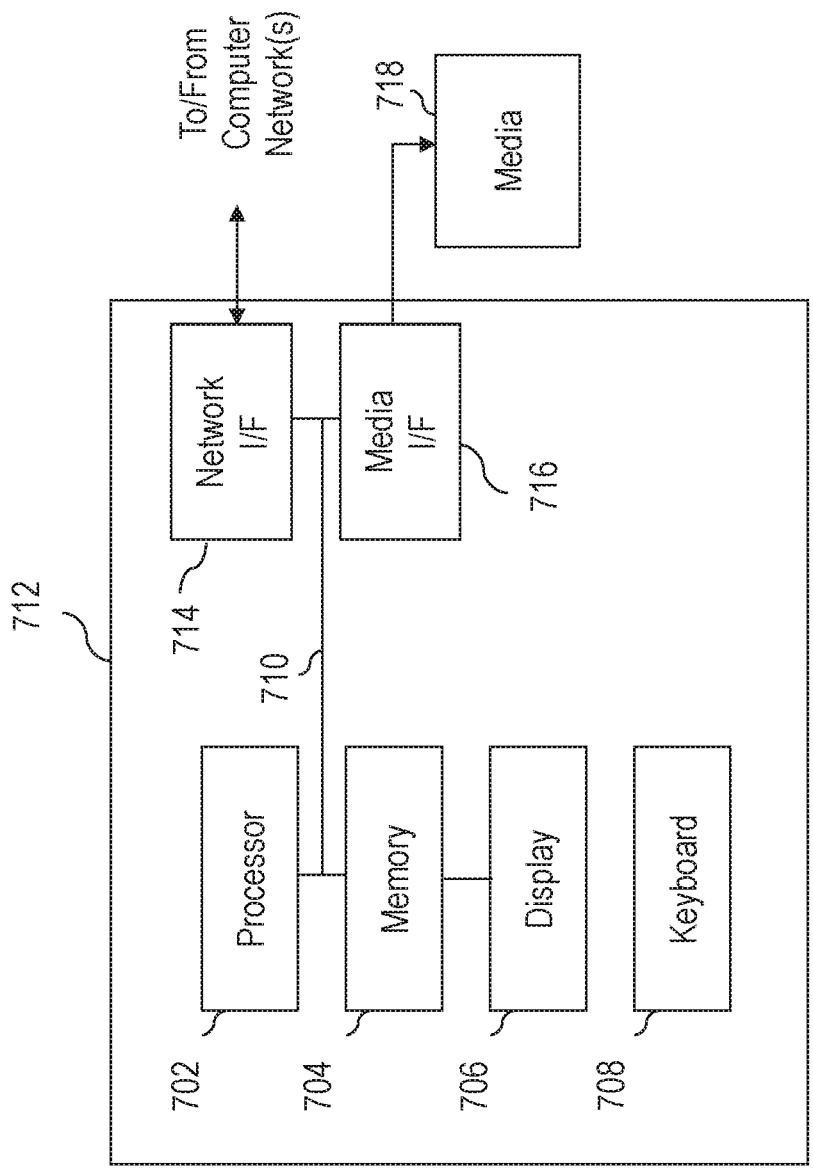
FIG. 7 is a system diagram of an exemplary computer system on which at least one embodiment of the invention can be implemented.

Additionally, an embodiment of the present invention can make use of software running on a computer or workstation. With reference to FIG. 7, such an implementation might employ, for example, a processor 702, a memory 704, and an input/output interface formed, for example, by a display 706 and a keyboard 708. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 702, memory 704, and input/output interface such as display 706 and keyboard 708 can be interconnected, for example, via bus 710 as part of a data processing unit 712. Suitable interconnections, for example via bus 710, can also be provided to a network interface 714, such as a network card, which can be provided to interface with a computer network, and to a media interface 716, such as a diskette or CD-ROM drive, which can be provided to interface with media 718.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 702 coupled directly or indirectly to memory elements 704 through a system bus 710. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 708, displays 706, pointing devices, and the like) can be coupled to the system either directly (such as via bus 710) or through intervening I/O controllers (omitted for clarity).

Network adapters such as network interface 714 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 712 as shown in FIG. 7) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 702. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
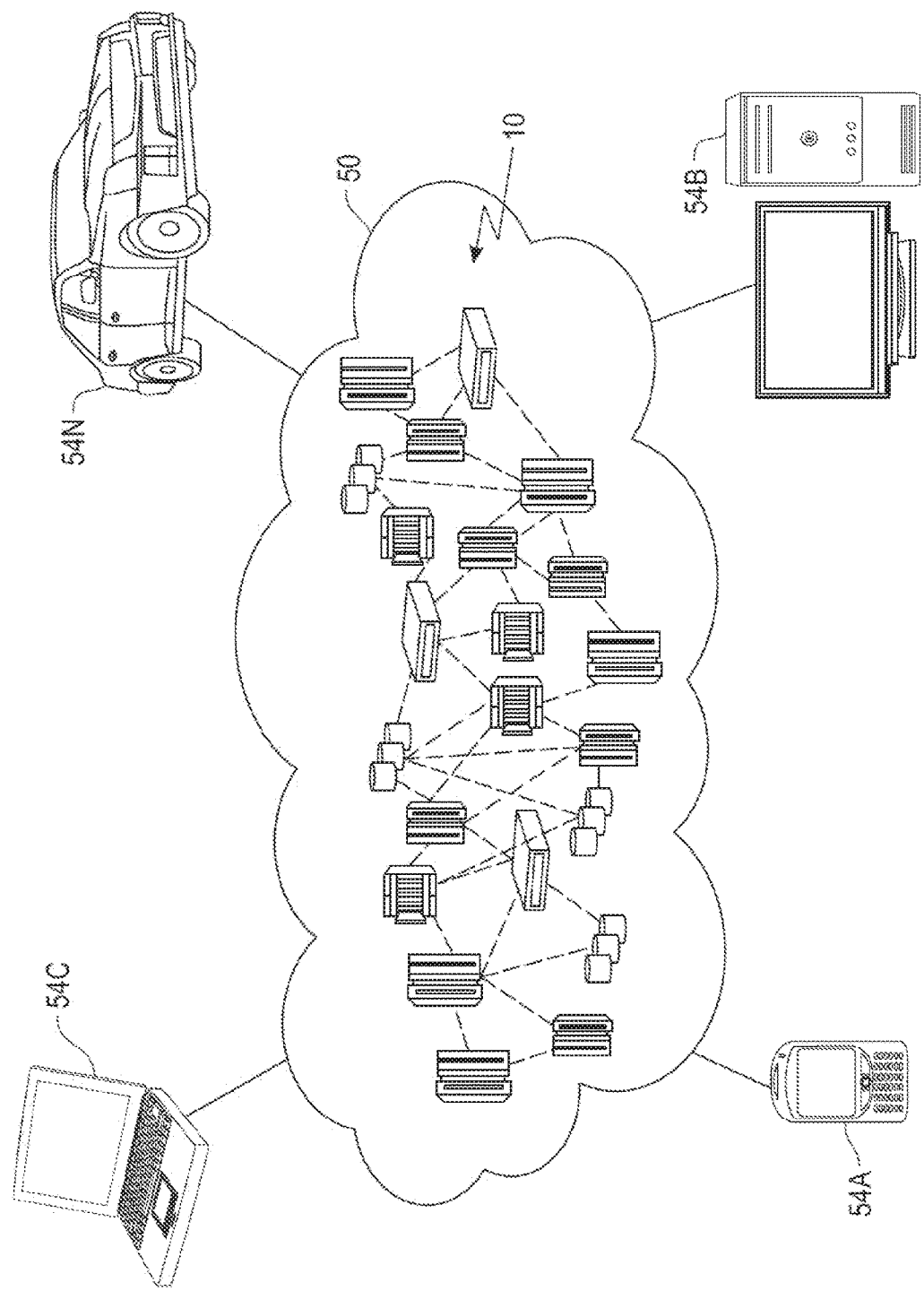
FIG. 8 depicts a cloud computing environment according to an embodiment of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
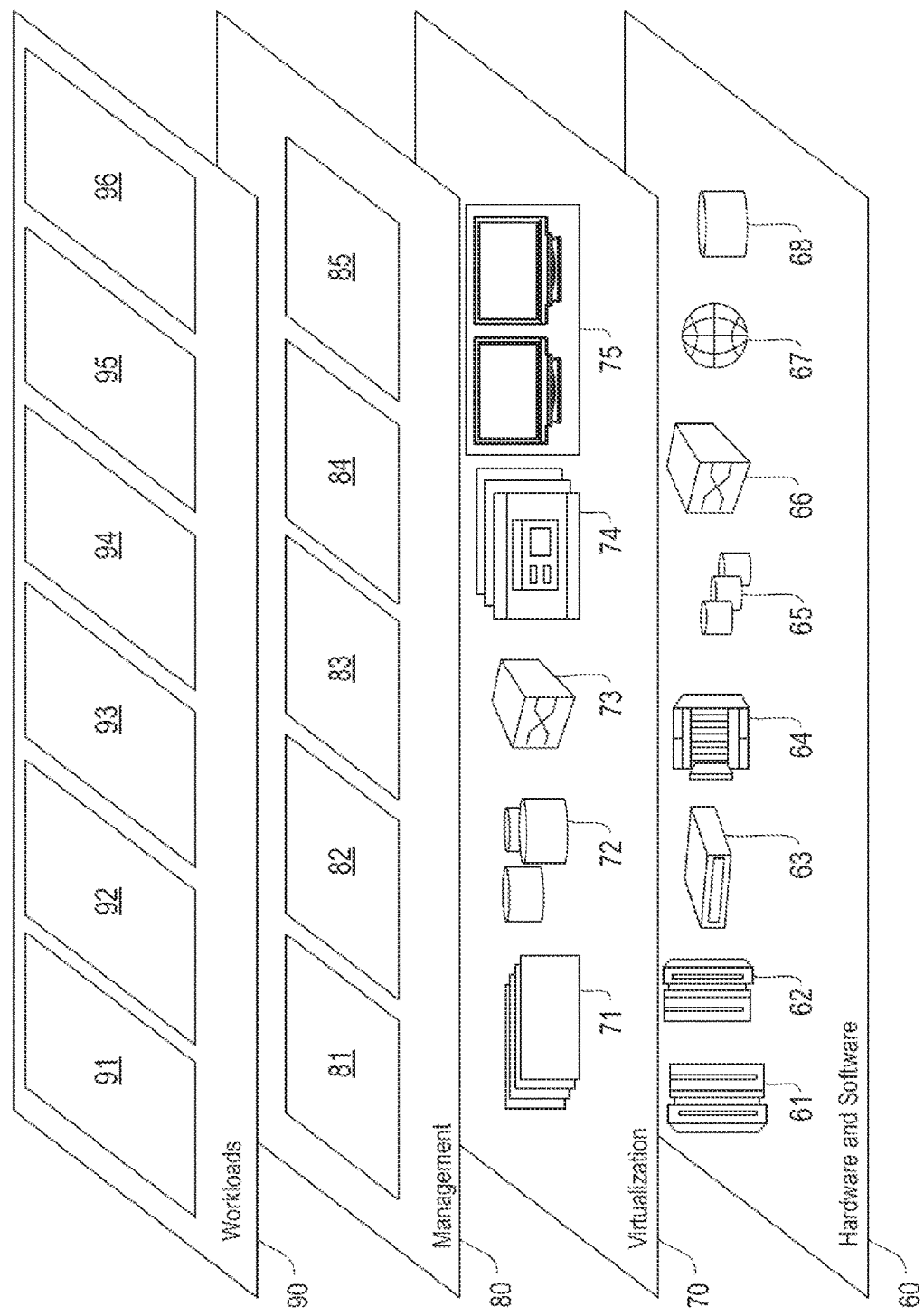
FIG. 9 depicts abstraction model layers according to an embodiment of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and automatic domain aware explainable anomaly and drift detection for multi-variate raw data using a constraint repository 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, automatically detecting anomalies and drift relevant to a context of a user and providing corresponding explanations. The detection may be performed using datasets in their most natural form without any encoding or transformations.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:

obtaining (i) a set of raw data and (ii) information indicative of a domain of said set of raw data, wherein the set of raw data is neither encoded nor transformed;
inferring at least one constraint from the set of raw data, wherein the at least one constraint corresponds to at least one attribute associated with the set of raw data;
determining whether a domain-indexed constraint repository comprises the at least one constraint for the domain of the set of raw data, wherein the domain-indexed constraint repository comprises a knowledge graph having a plurality of nodes that define hierarchical relationships of a plurality of domains, wherein each node comprises one or more constraints corresponding to one or more attributes;
in response to determining that the domain-indexed constraint repository comprises the at least one constraint for the domain of the set of raw data, detecting one or more anomalies in said set of raw data based at least in part on whether one or more portions of said set of raw data violate the at least one constraint;
updating at least a portion of the knowledge graph corresponding to the domain of the set of raw data based at least in part on the inferred at least one constraint;
generating an explanation corresponding to each of said one or more anomalies that describes the attributes corresponding to the violated at least one constraint, wherein the explanation corresponding to each of said one or more anomalies comprises a natural language explanation that describes how said portions violate the at least one constraint; and
outputting (i) an indication of said one or more anomalies and (ii) the corresponding explanations;
wherein the method is carried out by at least one computing device.

2. The computer-implemented method of claim 1, wherein each of one or more subtrees of the knowledge graph corresponds to a given one of the plurality domains, and wherein each level of a given one of the subtrees increases a level of abstraction of the given domain relative to a previous level in the given subtree.

3. The computer-implemented method of claim 1, wherein said detecting comprises:
mapping the set of raw data to one or more of the plurality of nodes based on said information indicative of the domain of said set of raw data; and
applying the constraints of the mapped nodes to the set of raw data to detect the one or more anomalies.

4. The computer-implemented method of claim 1, wherein the one or more constraints comprise at least one of:
a single attribute constraint; and
a multi-attribute constraint.

5. The computer-implemented method of claim 4, wherein the single attribute constraint corresponds to one of: (i) a text attribute; (ii) a numerical attribute; and (iii) a categorical attribute, and wherein the multi-attribute constraint corresponds to two or more of: (i) a text attribute; (ii) a numerical attribute; and (iii) a categorical attribute.

6. The computer-implemented method of claim 5, wherein each constraint comprises a model that is based on one or more of (i) the type of the single attribute constraint and (ii) the type of the multi-attribute constraint, and wherein said detecting comprises applying said model to at least a portion of the set of raw data.

7. The computer-implemented method of claim 1, wherein the set of raw data comprises real-time data of at least one machine learning model, and wherein the method comprises:

detecting drift in one or more segments of said real-time data using a machine learning clustering technique; and
outputting segments of said real-time data corresponding to said drift.

8. The computer-implemented method of claim 7, wherein said generating comprises generating and outputting an explanation for each of said segments of said real-time data corresponding to said drift.

9. The computer-implemented method of claim 1, wherein said detecting comprises:
determining a value indicating quality of the set of raw data based on a comparison of the set of raw data to a baseline set of data.

10. The computer-implemented method of claim 9, comprising:
validating said set of raw data in response to the value indicating the quality of the set of raw data satisfying a threshold value.

11. A computer program product comprising a computer readable storage medium having program instructions embodied therewith, the program instructions executable by a computing device to cause the computing device to:
obtain (i) a set of raw data and (ii) information indicative of a domain of said set of raw data, wherein the set of raw data is neither encoded nor transformed;
infer at least one constraint from the set of raw data, wherein the at least one constraint corresponds to at least one attribute associated with the set of raw data;
determine whether a domain-indexed constraint repository comprises the at least one constraint for the domain of the set of raw data, wherein the domain-indexed constraint repository comprises a knowledge graph having a plurality of nodes that define hierarchical relationships of a plurality of domains, wherein each node comprises one or more constraints corresponding t one or more attributes;
in response to determining that the domain-indexed constraint repository comprises the at least one constraint for the domain of the set of raw data, detect one or more anomalies in said set of raw data based at least in part on whether one or more portions of said set of raw data violate the at least one constraint;
update at least a portion of the knowledge graph corresponding to the domain of the set of raw data based at least in part on the inferred at least one constraint;
generate an explanation corresponding to each of said one or more anomalies that describes the attributes corresponding to the violated at least one constraint, wherein the explanation corresponding to each of said one or more anomalies comprises a natural language explanation that describes how said portions violate the at least one constraint; and
output (i) an indication of said one or more anomalies and (ii) the corresponding explanations.

12. The computer program product of claim 11, wherein each of one or more subtrees of the knowledge graph corresponds to a given one of the plurality domains, and wherein each level of a given one of the subtrees increases a level of abstraction of the given domain relative to a previous level in the given subtree.

13. The computer program product of claim 11, wherein said detecting comprises:
mapping the set of raw data to one or more of the plurality of nodes based on said information indicative of the domain of said set of raw data; and
applying the constraints of the mapped nodes to the set of raw data to detect the one or more anomalies.

14. The computer program product of claim 11, wherein the one or more constraints comprise at least one of:
- a single attribute constraint; and
- a multi-attribute constraint.

15. The computer program product of claim 14, wherein the single attribute constraint corresponds to one of: (i) a text attribute; (ii) a numerical attribute; and (iii) a categorical attribute, and wherein the multi-attribute constraint corresponds to two or more of: (i) a text attribute; (ii) a numerical attribute; and (iii) a categorical attribute.

16. The computer program product of claim 15, wherein each constraint comprises a model that is based on one or more of (i) the type of the single attribute constraint, and (ii) the type of the multi-attribute constraint, and wherein said detecting comprises applying said model to at least a portion of the set of raw data.

17. The computer program product of claim 11, wherein said detecting comprises:
- determining a value indicating quality of the set of raw data based on a comparison of the set of raw data to a baseline set of data.

18. The computer program product of claim 17, wherein the program instructions further cause the computing device to:
- validate said set of raw data in response to the value indicating the quality of the set of raw data satisfying a threshold value.

19. A system comprising:
- a memory; and
- at least one processor operably coupled to the memory and configured for:
  - obtaining (i) a set of raw data and (ii) information indicative of a domain of said set of raw data, wherein the set of raw data is neither encoded nor transformed;
  - inferring at least one constraint from the set of raw data, wherein the at least one constraint corresponds to at least one attribute associated with the set of raw data;
  - determining whether from a domain-indexed constraint repository comprises the at least one constraint for the domain of the set of raw data, wherein the domain-indexed constraint repository comprises a knowledge graph having a plurality of nodes that define hierarchical relationships of a plurality of domains, wherein each node comprises one or more constraints corresponding to one or more attributes;
  - in response to determining that the domain-indexed constraint repository comprises the at least one constraint for the domain of the set of raw data, detecting one or more anomalies in said set of raw data based at least in part on whether one or more portions of said set of raw data violate the at least one constraint;
  - updating at least a portion of the knowledge graph corresponding to the domain of the set of raw data based at least in part on the inferred at least one constraint;
  - generating an explanation corresponding to each of said one or more anomalies that describes the attributes corresponding to the violated at least one constraint, wherein the explanation corresponding to each of said one or more anomalies comprises a natural language explanation that describes how said portions violate the at least one constraint; and
  - outputting (i) an indication of said one or more anomalies and (ii) the corresponding explanations.

20. The system of claim 19, wherein each of one or more subtrees of the knowledge graph corresponds to a given one of the plurality domains, and wherein each level of a given one of the subtrees increases a level of abstraction of the given domain relative to a previous level in the given subtree.

* * * * *